(12) United States Patent
Huang

(10) Patent No.: US 11,841,536 B1
(45) Date of Patent: Dec. 12, 2023

(54) BI-DIRECTIONAL OPTICAL COMMUNICATION DEVICE REDUCED IN COMPLEXITY AND IN NUMBER OF COMPONENTS

(71) Applicant: SHUNYUN TECHNOLOGY (ZHONG SHAN) LIMITED, Zhongshan (CN)

(72) Inventor: Jie Huang, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 0 days.

(21) Appl. No.: 18/089,000

(22) Filed: Dec. 27, 2022

(30) Foreign Application Priority Data

Nov. 1, 2022 (CN) .......................... 202211355090.7

(51) Int. Cl.
*G02B 6/293* (2006.01)

(52) U.S. Cl.
CPC .................................... *G02B 6/293* (2013.01)

(58) Field of Classification Search
CPC ..................................................... G02B 6/293
See application file for complete search history.

(56) References Cited

U.S. PATENT DOCUMENTS

| | | | |
|---|---|---|---|
| 5,804,814 A | 9/1998 | Musha et al. | |
| 7,364,374 B2 * | 4/2008 | Liu ....................... | G02B 6/4246 385/94 |
| 8,992,100 B2 * | 3/2015 | Lim ...................... | G02B 6/4263 385/88 |
| 9,541,714 B2 * | 1/2017 | Lim ...................... | G02B 6/4246 |
| 9,784,919 B2 * | 10/2017 | Wang ................... | G02B 6/4263 |
| 10,326,527 B2 * | 6/2019 | Hailai .................. | H04B 10/50 |
| 2004/0141696 A1 | 7/2004 | Chen | |
| 2005/0147419 A1 * | 7/2005 | Verdiell ............... | H01S 5/4087 398/214 |
| 2005/0180755 A1 | 8/2005 | Masahiko | |
| 2006/0269197 A1 * | 11/2006 | Uno ..................... | G02B 6/4246 385/93 |
| 2020/0003969 A1 * | 1/2020 | Yamashita ........... | G02B 6/4214 |

FOREIGN PATENT DOCUMENTS

| | | |
|---|---|---|
| CN | 102213807 A | 10/2011 |
| CN | 102540364 A | 7/2012 |
| CN | 203705697 U | 7/2014 |
| CN | 104597575 A | 5/2015 |
| CN | 209690568 U | 11/2019 |
| CN | 1211206851 U | 8/2020 |
| CN | 112444926 A | 3/2021 |

* cited by examiner

*Primary Examiner* — Ellen E Kim
(74) *Attorney, Agent, or Firm* — ScienBiziP, P.C.

(57) ABSTRACT

A bi-directional optical communication device comprising a reduced number of components for speedier and less costly manufacture includes a plate and a wavelength-division multiplexer disposed on the plate. An optical-signal transmitter disposed on the board emits first beam to the wavelength-division multiplexer and an optical-signal receiver disposed on the board detects the second beam emitted by the wavelength-division multiplexer. An optical receptacle is disposed on the plate for actual connection to an optical fiber. The optical fiber emits the second beam to the wavelength-division multiplexer, and the multiplexer emits the first beam to the optical fiber.

6 Claims, 2 Drawing Sheets

BI-DIRECTIONAL OPTICAL COMMUNICATION DEVICE REDUCED IN COMPLEXITY AND IN NUMBER OF COMPONENTS

FIELD

The subject matter herein generally relates to a bi-directional optical communication devices.

BACKGROUND

Optical communications have low transmission loss, total immunity to electromagnetic interference (EMI), wide bandwidth, and are relatively secure in confidentiality. The optical communication module can receive inward optical signals and convert the optical signals into electrical signals. The optical communication module can also receive electrical signals and convert same into optical signals, and then transmit the optical signals outward.

In order to enable the optical communication device to have the function of bidirectional transmission, many optical components, such as light emitters, optical sensors, lenses, filters, and beam splitters, must be assembled to form an optical communication device.

However, since the optical communication device has many optical components, the assembly steps are relatively complicated. Precise alignment is required between multiple optical components, which increases production time and cost of the optical communication device.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
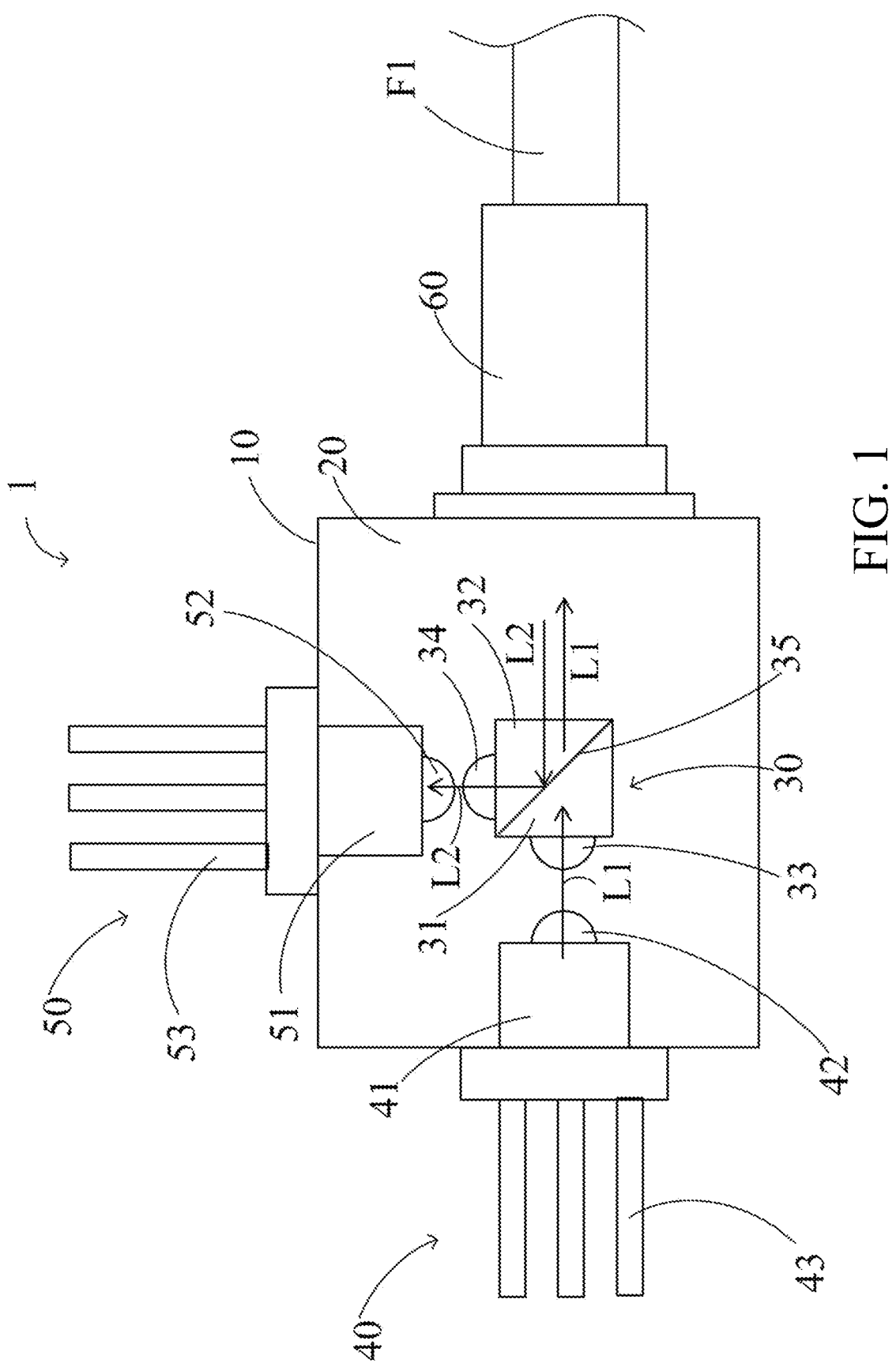
FIG. 1 is a schematic diagram of an optical communication device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connect" means directly or indirectly connected through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure provides an optical communication device with a bidirectional transmission function. A wavelength-division multiplexer is used to reduce dependence on multiple optical components, so that the precise alignment between optical components can be simplified, and the production cost and production time of the optical communication device can be reduced.

Figure 2:
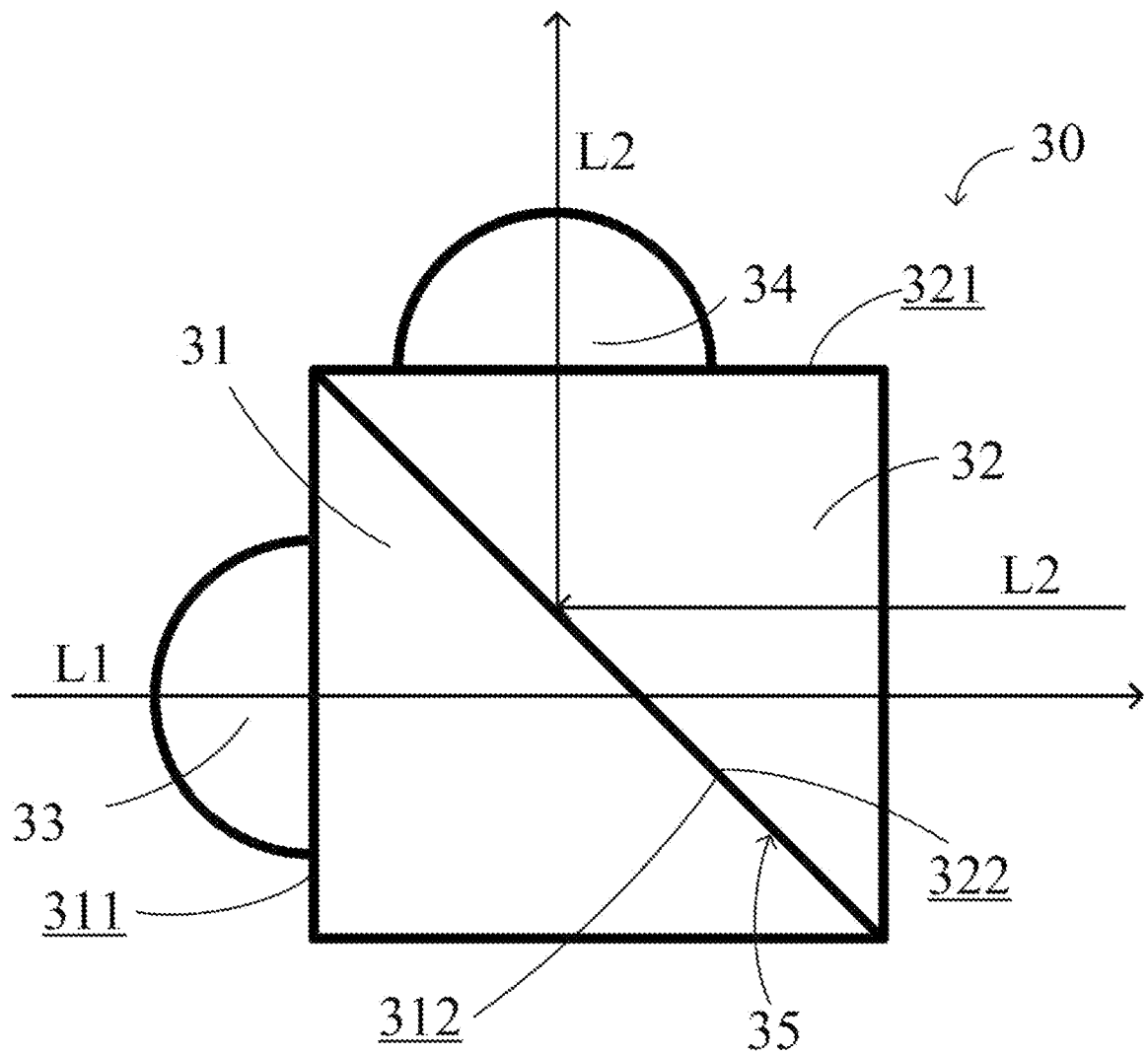
FIG. 2 is a schematic diagram of a wavelength-division multiplexer in the device of FIG. 1.

FIG. 1 is a schematic diagram of an optical communication device 1 in accordance with an embodiment of the present disclosure. FIG. 2 is a schematic diagram of the wavelength-division multiplexer 30 of FIG. 1. The optical communication device 1 is configured to be installed in an electronic apparatus (not shown in figures) so that the electronic apparatus can transmit and receive optical signals. The electronic apparatus can be a computer, a server, or a router, but is not limited thereto. The optical communication device 1 can be an optical transceiver module, used to receive electronic signals from the electronic apparatus, convert the electronic signals to optical signals, and output the optical signals as transmissions via an optical fiber F1. Moreover, the optical transceiver module can receive optical signals from the optical fiber F1, convert the optical signals to electronic signals, and transmit the electronic signals to the electronic apparatus.

In the embodiment, the optical communication device 1 may be a bi-directional optical sub-assembly (BOSA). The optical communication device 1 includes a housing 10, a board 20, a wavelength-division multiplexer 30, an optical-signal transmitter 40, an optical-signal receiver 50, and an optical receptacle 60. The housing 10 may be a metal housing 10. The board 20 is disposed in the metal housing 10. In one embodiment, the board 20 may be a circuit board.

The wavelength-division multiplexer (WDM) 30 is in the housing 10, and disposed on the board 20. In this embodiment, the wavelength-division multiplexer 30 is in a central area of the board 20.

The optical-signal transmitter 40 passes through the housing 10, and is disposed on the board 20. The optical-signal transmitter 40 is used to emit first beam L1 to the wavelength-division multiplexer 30. In this embodiment, the optical-signal transmitter 40 may be a transistor-outline CAN (TO-CAN) package. The optical-signal transmitter 40 may be a laser transmitter, such as a vertical-cavity surface-emitting laser), used to emit laser beam. In other words, the first beam L1 may be laser beam. The optical-signal transmitter 40 further includes a light emitting element 41, a first side lens 42, and first terminals 43. The light emitting element 41 is used to emit first beam L1. In some embodiments, the light emitting element 41 may be a light emitting diode (LED).

The first side lens 42 is affixed to the light emitting element 41, and configured to focus the first beam L1. The first side lens 42 may be a hemispherical structure, and may be a condenser lens. The first terminal 43 is connected to the light emitting element 41. In some embodiments, the first side lens 42 is not included in the optical-signal transmitter 40. The first terminal 43 protrudes over the housing 10. The first terminal 43 may be electrically connected to the electronic apparatus, and provide power to the light emitting element 41.

The optical-signal receiver 50 passes through the housing 10, and is disposed on the board 20. The optical-signal receiver 50 is used to detect the second beam L2 emitted from the wavelength-division multiplexer 30. In this embodiment, the optical-signal receiver 50 may be a transistor outline CAN (TO-CAN) package. The optical-signal receiver 50 may be a positive-intrinsic-negative diode, PIN diode), but it is not limited thereto. The optical-signal receiver 50 further includes an optical sensor 51, a second side lens 52, and a second terminal 53. The optical sensor 51 is configured to detect the second beam L2, and can convert the second beam L2 to electronic signals. The second side lens 52 is affixed to the optical sensor 51, and used to focus the second beam L2. The second side lens 52 may be a hemispherical structure, and may be a condenser lens. The second terminal 53 is connected to the optical sensor 51. In some embodiments, the second side lens 52 is not included in the optical-signal receiver 50. The second terminal 53 protrudes over the housing 10. The second terminal 53 is electrically connected to the electronic apparatus, and transmits the electronic signals generated by the optical sensor 51 to the electronic apparatus.

The optical receptacle 60 is disposed on the board 20, and used to connect to optical fiber F1. The second beam L2 is emitted from the optical fiber F1 to the wavelength-division multiplexer 30, and the first beam L1 is emitted from the wavelength-division multiplexer 30 to the optical fiber F1.

As shown in FIG. 2, the wavelength-division multiplexer 30 includes a first transparent element 31, a second transparent element 32, a first central lens 33, a second central lens 34, and a light-splitting element 35. In this embodiment, the first transparent element 31 and the second transparent element 32 are triangular columns.

The first transparent element 31 has a first flat surface 311, and a first inclined plane 312. The first flat surface 311 faces the optical-signal transmitter 40. The direction of the first beam L1 emitted by the optical-signal transmitter is perpendicular to the first flat surface 311. The first inclined plane 312 is connected to the first flat surface 311. The direction of the first beam L1 emitted by the optical-signal transmitter 40 forms an acute angle with the first inclined plane 312. In this embodiment, the acute angle is 45 degrees.

The second transparent element 32 has a second flat surface 321, and a second inclined plane 322. The second flat surface 321 faces the optical-signal receiver 50. The direction of the second beam L2 falling on the optical-signal receiver 50 is perpendicular to the second flat surface 321. The second inclined plane 322 is connected to the second flat surface 321. The direction of the second beam L2 emitted by the optical-signal receiver 50 forms an acute angle with the second inclined plane 322. In this embodiment, the acute angle is 45 degrees.

The first central lens 33 is connected to the first flat surface 311, and adjacent to the first side lens 42. The first central lens 33 may be a hemispherical structure, and may be a condenser lens. The second central lens 34 is connected to the second flat surface 312, and adjacent to the second side lens 52. The first central lens 33 may be a hemispherical structure, and may be a condenser lens.

The light-splitting element 35 is a plate structure, attached to the first inclined plane 312 and the second inclined plane 322, and is parallel to the first inclined plane 312 and the second inclined plane 322. In other words, the light-splitting element 35 is between the first transparent element 31 and the second transparent element 32. The light-splitting element 35 can be a film applied as a coating, coating the first inclined plane 312 and the second inclined plane 322. In this embodiment, the coating may be a metal coating. The thickness of the coating film is less than 100 nm. However, the materials and the thickness of the coating are not limited thereto. One has ordinary skill in the art can select the appropriate materials and thickness of the coating according to the function of the light-splitting element. The direction of the first beam L1 emitted by the optical-signal transmitter 40 forms an acute angle with the light-splitting element 35. In the embodiment, the acute angle is 45 degrees.

In this embodiment, the first transparent element 31, the second transparent element 32, the first central lens 33, the second central lens 34, and the light-splitting element 35 are integrated into one optical element, so alignment time between the optical elements is reduced, thereby reducing the production time of the optical communication device.

The wavelength of the first beam L1 is different from the second beam L2. In this embodiment, the wavelength of the first beam L1 is less than the wavelength of the second beam L2. The wavelength of the first beam L1 is in a range from 1250 nm to 1370 nm. The wavelength of the second beam L2 is in a range from 1430 nm to 1550 nm. For example, in this embodiment, the wavelength of the first beam L1 is about 1310 nm. The wavelength of the second beam L2 is about 1490 nm. In some embodiments, the difference in wavelengths of the first and second beams L1 and L2 is in a range from 60 nm to 200 nm. In this embodiment, the light-splitting element 35 allows the first beam L1 to pass through, and the light-splitting element 35 is used to reflect the second beam L2. The refractive index of the light-splitting element 35 is greater than the refractive index of the first transparent element 31 and the second transparent element 32.

As shown in FIG. 1 and FIG. 2, as the first beam L1 is emitted by the optical-signal transmitter 40, the first beam L1 is focused by the first side lens 42 and the first central lens 33, and passes through the first transparent element 31, the light-splitting element 35, and the second transparent element 32 in sequence. Then first beam L1 falls on the optical receptacle 60, and enters into the optical fiber F1.

It should be noted that the optical paths of the first beam L1 and the first beam L2 in FIG. 1 and FIG. 2 are for illustration. The actual optical paths of the first beam L1 and the first beam L2 are not limited to those shown in FIG. 1 and FIG. 2.

When the second beam L2 in the optical fiber F1 is emitted to the wavelength-division multiplexer 30, the second beam L2 passes through the second transparent element 32 and is reflected by the light-splitting element 35. The second beam L2 reflected by the light-splitting element 35 passes through the second transparent element 31. Then the second beam L2 is focused onto the optical sensor 51 by the second central lens 34 and the second side lens 52.

According to the embodiments of the disclosure, the optical communication device of the present disclosure utilizes the wavelength-division multiplexer to simplify the components of the optical communication device, thereby reducing the manufacturing cost of the optical communication device.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical communication device, comprising:
   a board;
   a wavelength-division multiplexer disposed on the board, comprising:
      a first transparent element having a first flat surface and a first inclined plane;
      a second transparent element having a second flat surface and second inclined plane;
      a first central lens connected to the first flat surface;
      a second central lens connected to the second flat surface; and
      a light-splitting element attached to the first inclined plane and the second inclined plane;
   an optical-signal transmitter disposed on the board, comprising:
      a light emitting element configured to emit a first beam to the wavelength-division multiplexer; and
      a first side lens affixed to the light emitting element, adjacent to the first central lens, and configured to focus the first beam;
   an optical-signal receiver disposed on the board, comprising:
      an optical sensor configured to detect a second beam emitted by the wavelength-division multiplexer; and
      a second side lens affixed to the optical sensor, adjacent to the second central lens, and used to focus the second beam; and
   an optical receptacle disposed on the board, and configured to connect to an optical fiber;
   wherein the first transparent element, the second transparent element, the first central lens, the second central lens, and the light-splitting element are integrated into one optical element;
   wherein the second beam is emitted from the optical fiber to the wavelength-division multiplexer, and the first beam is emitted from the wavelength-division multiplexer to the optical fiber.

2. The optical communication device as claimed in claim 1, wherein a wavelength of the first beam is not equal to a wavelength of the second beam.

3. The optical communication device as claimed in claim 1, wherein
   the first flat surface faces the optical-signal transmitter; and flail the first inclined plane is connected to the first flat surface; and
   the second flat surface faces the optical-signal receiver; and flail the second inclined plane is connected to the second flat surface.

4. The optical communication device as claimed in claim 3, wherein the first transparent element and the second transparent element are triangular columnar.

5. The optical communication device as claimed in claim 1, wherein the light-splitting element is a coating film.

6. The optical communication device as claimed in claim 5, wherein the coating film is a metal coating film.

* * * * *